US008160024B1

(12) United States Patent
Ghaus et al.

(10) Patent No.: US 8,160,024 B1
(45) Date of Patent: Apr. 17, 2012

(54) METHOD AND SYSTEM FOR HANDOFF AT INTER-RADIO-NETWORK-CONTROLLER BOUNDARY

(75) Inventors: Mohammad Ghaus, Ashburn, VA (US); Pinal Tailor, Ashburn, VA (US); Esmail Dinan, Herndon, VA (US)

(73) Assignee: Sprint Spectrum L.P., Overland, KS (US)

( * ) Notice: Subject to any disclaimer, the term of this patent is extended or adjusted under 35 U.S.C. 154(b) by 815 days.

(21) Appl. No.: 12/206,241

(22) Filed: Sep. 8, 2008

(51) Int. Cl.
*H04W 4/00* (2009.01)

(52) U.S. Cl. ........ 370/331; 455/436; 455/439; 455/442; 455/33.2

(58) Field of Classification Search .................. 370/331; 455/436, 439, 442, 33.2
See application file for complete search history.

(56) References Cited

U.S. PATENT DOCUMENTS

| | | | |
|---|---|---|---|
| 5,873,033 A | 2/1999 | Hjern et al. | |
| 5,930,710 A | 7/1999 | Sawyer et al. | |
| 6,167,269 A | 12/2000 | Kondo | |
| 6,360,093 B1 | 3/2002 | Ross et al. | |
| 7,933,623 B1 * | 4/2011 | Vu | 455/519 |
| 2003/0224786 A1 * | 12/2003 | Lee et al. | 455/432.1 |
| 2005/0255849 A1 | 11/2005 | Kang et al. | |
| 2006/0274692 A1 | 12/2006 | Ryu | |
| 2008/0004026 A1 | 1/2008 | Gross et al. | |
| 2008/0254798 A1 * | 10/2008 | Power et al. | 455/436 |

FOREIGN PATENT DOCUMENTS

EP 1821560 A1 8/2007

OTHER PUBLICATIONS

"Hughes Systique Coroporation/EVDO," http://myhsc.pbwiki.com/EVDO, printed from the World Wide Web on Jun. 20, 2008.
Lu et al.,"Handoff Prediction by Mobility Characteristics in Wireless Broadband Networks," Proceedings of the Sixth IEEE International Symposium on a World of Wireless Mobile and Multimedia Networks, 2005.
Lu et al., "The Study of Handoff Prediction Schemes for Resource Reservation in Mobile Multimedia Wireless Networks," Proceedings of the 18th International Conference on Advanced Information Networking and Application, 2004.
Feng et al., "Explicit Proactive Handoff with Motion Prediction for Mobile IP," IEEE Communications Society, 2004.

* cited by examiner

*Primary Examiner* — Jeffrey Pwu
*Assistant Examiner* — Abdelnabi Musa

(57) ABSTRACT

A method is disclosed that can be carried out in an access network comprising a plurality of coverage areas, each coverage area being served by an RNC. The method involves making a determination that an access terminal is located in an inter-RNC boundary zone, and then, during a communication session: (i) determining that a handoff from a source coverage area to a target coverage area should be performed; (ii) determining whether or not the target coverage area is served by the same RNC as the source coverage area; (iii) if the target coverage area is not served by the same RNC as the source coverage area, delaying handoff until a current segment of the communication session is complete; and (iv) if the target coverage area is served by the same RNC, handing off the communication session to the target coverage area.

20 Claims, 3 Drawing Sheets

METHOD AND SYSTEM FOR HANDOFF AT INTER-RADIO-NETWORK-CONTROLLER BOUNDARY

BACKGROUND

In a typical wireless communication system or access network, an area is divided geographically into a number of coverage areas (e.g., cells and cell sectors), each defined by a radiation pattern from one or more base station antennae. As an access terminal moves between coverage areas of an access network, or when an access terminal transfers a communication session between coverage areas for any other reason, a "handoff" from a "source" or "serving" coverage area to a "target" coverage area may be performed. In a typical case, the handoff process is triggered by the access terminal monitoring the signal strength that it receives from the various available coverage areas, and the access terminal and/or a radio network controller (RNC) determining that one or more threshold criteria are met such that a handoff should be performed.

A handoff of a communication session may require transfer of information at several levels. For instance, the source and target sectors that are involved in a handoff may be served by different base stations, which in turn may be served by different RNCs. In this scenario, a handoff from the source sector to the target sector may require a transfer of session information from the source RNC to the target RNC and a transfer from the source base station to the target base station. Alternatively, the source and target sectors may be served by different base stations that are served by the same RNC. In this scenario, a transfer of session information between RNCs may not be required. Further, in the event a handoff is between sectors served by the same base station, a transfer between base stations may also be unnecessary.

To facilitate the transfer of information between RNCs, a base station may send an access terminal a "quickconfig" message, which includes a color code that identifies the RNC serving the base station. When the access terminal receives a quickconfig including a color code that differs from the color code included in its last received quickconfig message, the access terminal may attempt to establish a session with the RNC identified by the new color code (in the event the access terminal is not already engaged in a session) or may attempt to handoff to the RNC identified by the new color code (if a session is already in progress).

Overview

In an access network, an inter-RNC boundary zone may be defined by the overlap or adjacency of coverage areas served by different RNCs. An access terminal that is located in an inter-RNC boundary zone may therefore experience "ping-pong" between coverage areas. In particular, an access terminal located in an inter-RNC boundary zone may receive multiple quickconfig messages from multiple RNCs at approximately the same time or in rapid succession. As a result, the access terminal may repeatedly attempt to initiate or handoff a session, switching back and forth between the base stations served by the different RNCs. In doing so, the access terminal may repeatedly initiate session negotiation or handoff procedures, and thus consume additional network resources with each attempt.

In addition to consuming network resources, ping-ponging between RNCs may result in failure during session setup and/or during handoff of a communication session. This problem may be amplified for low-latency communications (such as QChat and other types of push-to-talk communications), for which the latency during an inter-RNC handoff (i.e., a handoff between two base stations served by different RNCs) may surpass tolerable levels. The problem may be further amplified for access terminals that are largely stationary or moving slowly through a coverage area. A low-mobility access terminal is more likely to experience ping-pong because it is more likely to remain in an inter-RNC boundary zone, rather than moving into one coverage area or the other. To help prevent session failure at inter-RNC boundaries, a method and access terminal to detect when the access terminal is located in an inter-RNC boundary zone and responsively adjust the handoff procedure used by the access terminal, are disclosed herein.

In one aspect, a method is disclosed that can be carried out in an access network comprising a plurality of coverage areas, wherein each coverage area is served by one of a plurality of RNCs. The method involves making a determination that an access terminal is located in an inter-RNC boundary zone. The method further involves, after making the determination that the access terminal is located in the inter-RNC boundary zone, and during a communication session between the access terminal and the access network via a source coverage area of the access network: (i) determining that a handoff of the communication session to a target coverage area should be performed; (ii) determining whether or not the target coverage area is served by the same RNC as the source coverage area; (iii) if the determination is that the target coverage area is not served by the same RNC as the source coverage area, delaying handoff until a current segment of the communication session is complete, and then handing off the communication session to the target coverage area; and (iv) if the determination is that the target coverage area is served by the same RNC as the source coverage area, handing off the communication session to the target coverage area, regardless of whether a current segment of the communication session is complete.

In an exemplary embodiment, each coverage area is a sector of the access network. Further, each sector is served by one of the RNCs via one of a plurality of base stations, with the source sector being served by a source base station and the target sector being served by a target base station. As such, the step of determining whether or not the target coverage area is served by the same RNC as the source coverage area may be achieved by determining whether or not the target base station is served by the same RNC as the source base station.

The method may further involve receiving an intra-RNC list from the access network. The intra-RNC list may identify one or more of the plurality of base stations that are served by the same RNC as the source base station, or may indicate that no base stations are served by the same RNC as the source base station. In such an embodiment, the step of determining whether or not the target coverage area is served by the same RNC as the source coverage area may involve using the intra-RNC list as a basis for determining whether or not the target base station is served by the same RNC as the source base station.

In another aspect, an access terminal configured to engage in a communication session with an access network is disclosed. The access network may comprise a plurality of coverage areas, with each coverage area being served by one of a plurality of RNCs. The access terminal comprises data storage, at least one processor, and program code stored in data storage and executable by the processor to make a determination that the access terminal is located in an inter-RNC boundary zone. The inter-RNC boundary zone comprises an area where a first coverage area that is served by a first RNC is adjacent to or overlaps with a second coverage area that is served by a second RNC. The program code may be further executable to (i) while the access terminal is located in a source coverage area of the access network, establish a communication session between the access terminal and the access network and (ii) after the determination that the access terminal is located in the inter-RNC boundary zone has been made, (a) determine that a handoff of the communication session from the source coverage area to a target coverage area should be performed; (b) determine whether or not the target coverage area is served by the same RNC as the source coverage area; (c) if the determination is that the target coverage area is not served by the same RNC as the source coverage area, delay handoff until a current segment of the communication session is complete, and then initiate a handoff off the communication session to the target coverage area; and (d) if the determination is that the target coverage area is served by the same RNC as the source coverage area, hand off the communication session to the target coverage area, regardless of whether a current segment of the communication session is complete.

In another aspect, a method is disclosed that may be carried out in an access network comprising a plurality of coverage areas, wherein each coverage area is served by one of a plurality of RNCs. The method comprises (a) characterizing an access terminal as a low-mobility access terminal; (b) establishing a communication session between the access terminal and the access network, wherein the communication session is established in a first coverage area of the access network; and (c) after characterizing an access terminal as a low-mobility access terminal: (i) determining that a handoff of the communication session to a second coverage area should be performed; (ii) determining whether or not the second coverage area is served by the same RNC as the first coverage area; (iii) if the determination is that the second coverage area is not served by the same RNC as the first coverage area, delaying handoff until a current segment of the communication session is complete, and then handing off the communication session to the second coverage area; and (iv) if the determination is that the second coverage area is served by the same RNC as the first coverage area, handing off the communication session to the second coverage area, regardless of whether a current segment of the communication session is complete.

The method and system disclosed herein may be particularly useful for low-latency applications such as QChat and other push-to-talk applications. QChat is a software application developed for access terminals and servers implementing a QChat server. QChat allows users to engage in one-to-one and/or one-to-many sessions over 3G CDMA networks and may be implemented in an access network using standard voice-over Internet protocol (VoIP) technologies.

These as well as other aspects and advantages will become apparent to those of ordinary skill in the art by reading the following detailed description, with reference where appropriate to the accompanying drawings. Further, it should be understood that the embodiments described in this summary and elsewhere are intended to be examples only and do not necessarily limit the scope of the invention.

BRIEF DESCRIPTION OF THE DRAWINGS

An exemplary embodiment of the present invention is described herein with reference to the drawings, in which.

DETAILED DESCRIPTION

Figure 1:
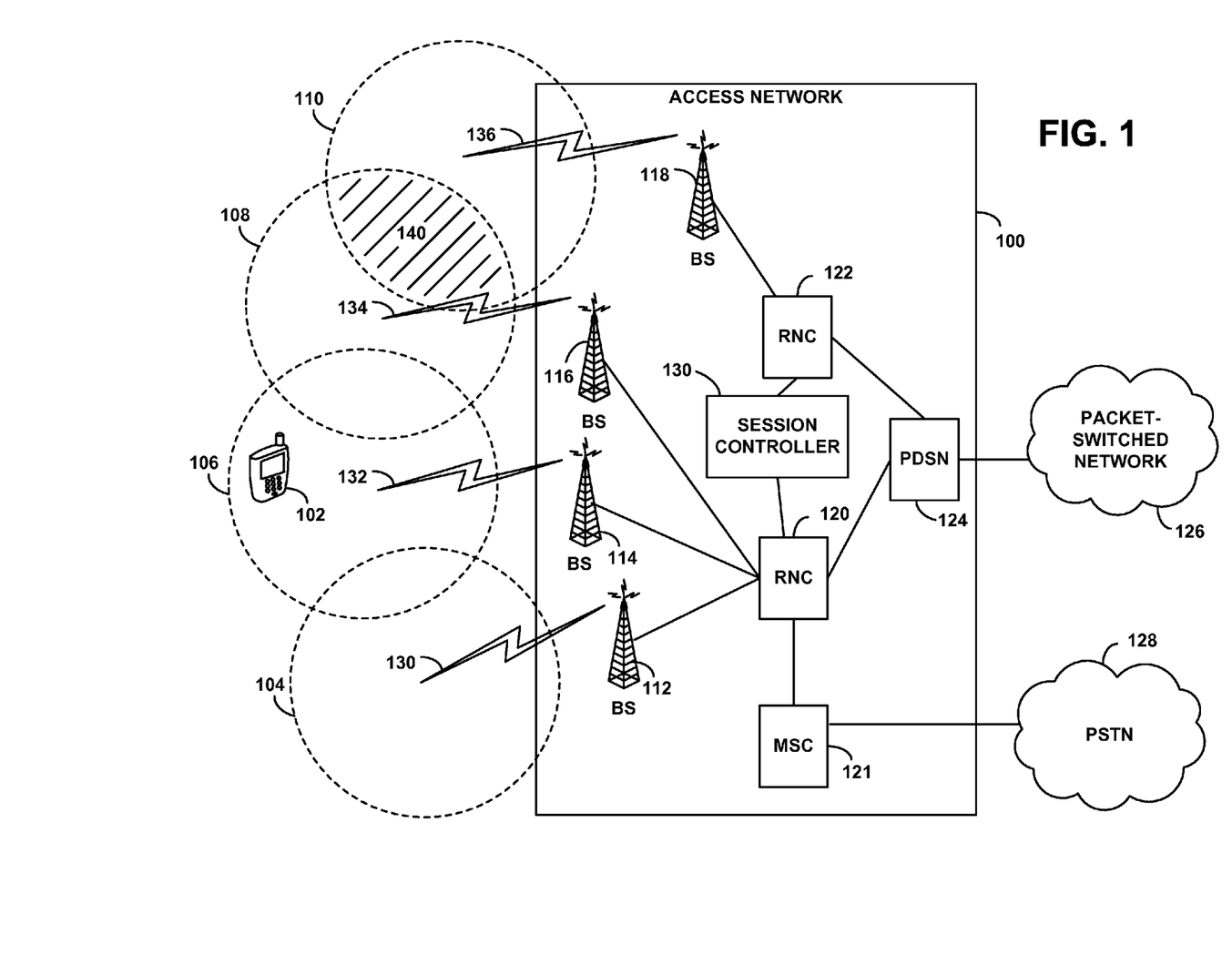
FIG. 1 is a simplified block diagram depicting a telecommunications system in which an exemplary embodiment of the invention can be implemented.

Referring to the drawings, FIG. 1 is a simplified block diagram of a telecommunications system in which an exemplary embodiment of the invention can be implemented. As shown, the system includes at its core an access network 10, which may function to provide connectivity between one or more access terminals 102 (e.g., a cell phone, PDA, or other wirelessly-equipped device), and one or more transport networks, such as a circuit-switched network (e.g., the public switched telephone network (PSTN) 128) or a packet-switched network 126 (e.g., the Internet).

It should be understood, however, that this and other arrangements described herein are set forth for purposes of example only. As such, those skilled in the art will appreciate that other arrangements and other elements (e.g., machines, interfaces, functions, orders of functions, etc.) can be used instead, some elements may be added, and some elements may be omitted altogether. Further, as in most telecommunications applications, those skilled in the art will appreciate that many of the elements described herein are functional entities that may be implemented as discrete or distributed components or in conjunction with other components, and in any suitable combination and location. Still further, various functions described herein as being performed by one or more entities may be carried out by hardware, firmware and/or software logic. For instance, various functions may be carried out by a processor executing a set of machine language instructions stored in memory.

As shown, the access network 100 may include a plurality of base stations 112-118. Each base station 112-118 of the access network 100 may function to transmit RF-radiation patterns at one or more carrier frequencies, and the RF-radiation patterns may then provide one or more air interfaces 130-136 over which the access terminal 102 may communicate with the access network 100. For example, each base station 112-118 may transmit omni-directional RF-radiation patterns that provide a single air interface 130-136. Alternatively, each base station 112-118 may transmit directional RF-radiation patterns that provide multiple air interfaces.

Each of the air interfaces 130-136 may define a corresponding wireless coverage area of its corresponding base station 112-118. For example, if the first base station 112 provides a single air interface 130, then the first base station 112 may serve a single wireless coverage area 104 (e.g., a cell). Alternatively, if a base station provides multiple air interfaces, the base station may serve multiple wireless coverage areas (e.g., sectors). In either case, each of the one or more air interfaces 130-136 and their corresponding wireless coverage areas may be defined by the one or more carrier frequencies of their respective serving base station 112-118 and/or a pseudo-random number (PN) offset that distinguishes one wireless coverage area of the a given base station from another.

The air interfaces 130-136 of the base stations 112-118 may carry communications between the access network 100 and access terminal 102 according to any of a variety of protocols. For example, the air interfaces 130-136 may carry communications according to CDMA (e.g., 1xRTT, IS-856), iDEN, TDMA, AMPS, GSM, GPRS, UMTS, EDGE, WiMAX (e.g., IEEE 802.16), LTE, microwave, satellite, MMDS, Wi-Fi (e.g., IEEE 802.11), Bluetooth, infrared, and other protocols now known or later developed. Depending on the protocol employed, the air interfaces 130-136 may also be divided into a plurality of channels for carrying different types of communications between the access terminal 102 and the access network 100. For example, each air interface 130-136 may include forward-link channels (e.g., control channels, forward-traffic channels, etc.) for carrying forward-link communications from the access network 100 to the access terminal 102, as well as reverse-link channels (e.g., access channels, reverse-traffic channels, etc.) for carrying reverse-link communications from the access terminal 102 to the access network 100.

Each base station tower is typically connected with a radio network controller (RNC) (also known as a base station controller (BSC)). In access network 100, base stations 112-116 are connected to RNC 120, and base station 110 is connected to RNC 122. Each RNC may function to communicate with and control aspects of the base stations it serves, as well as aspects of air-interface communications with the access terminal 102. For example, the RNC 24 may control assignment of air-interface traffic channels to access terminal 102. As another example, the RNC 24 may control aspects of a given access terminal 102 switching between coverage areas of the access network 100. Many other examples are possible as well.

An RNC, such as RNC 120, may then couple to a switch or gateway, such as a mobile switching center (MSC) 121, which may provide connectivity with PSTN 128. Further, RNC 120 may also couple to a switch or gateway, such as a PDSN 124, which may provide connectivity with the packet-switched network 126. In this respect, RNC 120 may additionally include a packet control function ("PCF") for controlling packet-data communications. Accordingly, with this general arrangement, the access network 100 may facilitate communications between access terminals operating in the access network's coverage areas and PSTN 128 and/or the packet-switched network 126.

In access network 100, an RNC or a group of RNCs may constitute a subnet of the wireless communication system. Each subnet may be identified by a subnet mask (128-bit code). Further, each RNC within a subnet may be identified by a unique color code. For example, RNC 120 and 122 may be part of the same subnet of access network 100, and thus may be identified by the same subnet mask. However, each RNC 120 and 122 may be identified by a different color code. Other RNC organizational hierarchies and identification schemes are also possible.

Each RNC 120, 122 may also be coupled with or have access to a session controller 130. Session controller 130 may function to coordinate aspects of communication sessions between various RNCs in an access network, such as RNCs 120, 122. Multiple RNCs in access network 100 may be connected to a single session controller 130 as depicted. However, it should be understood that multiple session controllers may operate cooperatively to carry out the functionality described in reference to a single session controller, without departing from the scope of the invention.

In a preferred example, the access terminal 102 will communicate with the access network 100 according to an IS-856 protocol (also known as Evolution-Data Optimized (EV-DO)), such as IS-856 Rel. 0 or IS-856 Rev. A. IS-856 leverages the asymmetric characteristics of most IP traffic, in which a forward link typically carries a higher load than a reverse link. Under IS-856, the forward link of an air interface 130-136 uses time division multiplexing (TDM), in order to allocate all power in a coverage area to a given user at any moment, while the reverse link of the air interface 130-136 retains largely the traditional 1xRTT code division multiplexing (CDM) format, albeit with the addition of a "data rate control" (DRC) channel and a "data source control" (DSC) channel, as described in more detail below. As a result of the full-power allocation by the coverage area, an IS-856 access terminal can, in theory, receive packet-data at a rate of at least 38.4 kbps and up to 2.4 Mbps.

As described above, each wireless coverage area in IS-856 may be defined by one or more carrier frequencies and a PN offset, and the pilot channel of an air interface 130-136 may carry an indication of this information. An IS-856 access terminal 102 may then measure the pilot signals emitted by the access network 100 for each coverage area detected by the access terminal 102, to determine signal conditions (e.g., measured as a carrier-to-interference (C/I) ratio, or a signal-to-interference-plus-noise ratio (SINR)) of each detected coverage area. The access terminal 102 may then report the signal conditions for each detected coverage area to the access network 100, such as by sending the access network 100 a Route Update Message (also known as a Pilot Strength Measurement Message (PSMM)).

Based on the signal conditions determined by the access terminal 102, the access terminal 102 and/or the access network 100 may generate a dynamic list of "active" coverage areas for the access terminal 102 (known as the access terminal's "active set"), which typically includes the strongest coverage areas of the access network 100 as detected by the access terminal 102. The access terminal's active set may be maintained by both the access terminal 102 and the access network 100, and may include a PN offset and signal strength for each included coverage area (e.g., of which there can be up to three or six according to current standards). The access network 100 may then allocate resources for the access terminal 102 (e.g., a traffic channel identified by MAC identifier) in each coverage area in the active set, and the access terminal 102 may actively monitor the coverage areas in the active set. Thereafter, the active set for the access terminal 102 may be dynamically adjusted to reflect changing air-interface conditions as measured by the access terminal 102.

At any one time, the IS-856 access terminal 102 may then selectively receive communications from a single "serving" coverage area of the access network 100, which the access terminal 102 selects from its active set. In this respect, the access terminal 102 will typically select the strongest coverage area from its active set as the serving coverage area. The access terminal 102 may notify the access network 100 of its selected serving coverage area, and request service in that coverage area, by sending the access network 100 one or more groups of consecutive DRC messages on the reverse-link DRC channel. (It should be understood that each DRC message is sent during a separate timeslot of the reverse-link DRC channel). Each DRC message within a group of consecutive DRC messages may then include (i) a "DRC Cover," which is an indication of the coverage area in which the access terminal 102 wishes to be served, and (ii) a "DRC Rate," which is an indication of the data rate requested by the access terminal 102 in the selected coverage area. The DRC rate may be a value, ranging from 1 to 12, which represents a different data rate (e.g., DRC rate=1 indicates a data rate of 38.4 kbps).

Current IS-856 protocols require that each group of consecutive DRC messages sent by access terminal 102 consist of a specific number of consecutive DRC messages, and that specific number may be referred to as "DRCLength." In this respect, according to current IS-856 protocols, access terminal 102 must send DRC messages in multiples of DRCLength. For example, in IS-856 Rev. A, DRCLength may have a value of 4, in which case the access terminal 102 must send DRC messages to the access network 100 in groups of 4. Further, according to current IS-856 protocols, each DRC message within a given group of consecutive DRC messages must have the same DRC cover and DRC rate. In this respect, current IS-856 access terminal 102 may only change its DRC Cover and/or DRC Rate after sending every DRC message in a given group of DRC messages (i.e., access terminal 102 may only change its DRC Cover and/or DRC Rate every DRCLength consecutive DRC messages).

The serving base station 114 of the access network 100 may then receive the one or more groups of consecutive DRC messages from the access terminal 102. (It should be understood that other base stations 112, 116, 118, which may be encompassed by the access terminal's active set, may also receive the DRC messages, but that only the first serving base station 114 will decode and process the DRC messages according to the DRC Cover specifying the serving coverage area). Upon and then while receiving the one or more groups of consecutive DRC messages, the serving base station 114 may serve the access terminal 102 in the specified coverage area until the access terminal 102 selects a different serving coverage area. In this respect, the serving base station 114 may request the RNC 120 to send the serving base station 114 any data addressed to the access terminal 102, and the base station 114 may then send the data addressed to the access terminal 102 over the air interface 132 that defines the serving coverage area during timeslots allocated for the access terminal 102. In turn, the access terminal 102 may receive the data from the serving base station 114. In this respect, the access terminal may only decode and process transmissions from the access network 100 according to the PN offset of the serving coverage area and the access terminal's MAC identifier. (It should be understood that other base stations 112, 116, 118, which may be encompassed by the access terminal's active set, may also be concurrently transmitting data on their respective forward-link channels, but that the data will not be intended for the access terminal 102 and the access terminal 102 will not attempt to decode and process these transmissions).

As the access terminal 102 moves through coverage areas of the access network 100 and/or air-interface conditions change, the access terminal 102 may also wish to switch its selection of serving coverage area. In this respect, the access terminal 102 may inform the access network 100 of the access terminal's desire to switch to a new serving coverage area, and the access network 100 may then control the switching of coverage areas by "handing off" service of the access terminal 102 from the current coverage area to the new coverage area without breaking or interrupting current or active communication with the access terminal 102. According to current IS-856 protocols, this handoff process may be carried out in a variety of ways.

In one example, the access terminal 102 may request to switch coverage areas of the access network 100 by first sending the access network 100 a predefined number of consecutive DRC messages that include "null-covers," which are special DRC covers that do not specify any coverage area of the access network 100. Current IS-856 protocols require access terminal 102 to send 2*DRCLength consecutive DRC messages (i.e., two groups of DRC messages) with null-covers when requesting a coverage area switch. Upon receiving a first DRC message with the null cover from the access terminal 102, the access network 100, and specifically the serving base station 114, may then stop serving the access terminal 102 in the current coverage area.

After sending the predefined number (i.e., 2*DRCLength) of consecutive DRC messages with null-covers, the access terminal 102 may then notify the access network 100 of the newly-selected coverage area, and request service in that coverage area, by sending the access network 100 at least a first group of consecutive DRC messages specifying the new coverage area. In turn, the access network 100, and specifically the new base station 114, may prepare to serve the access terminal 102 in the new coverage area and then begin serving the access terminal 102 in the new coverage area. However, in practice, an undesirable delay may occur before the access network 100 actually begins serving the access terminal 102 in the new coverage area, especially when the access network 100 needs to establish a backhaul connection with and buffer data at a new base station 114 before serving the access terminal 102 in the new coverage area.

In order to improve the handoff process described above, the access terminal 102 may provide the access network 100 with advance notification of a newly selected serving coverage area, and request future service in that coverage area, by sending the access network 100 at least one group of consecutive DSC messages on the reverse-link DSC channel. (It should be understood that because DRC messages and DSC messages occupy different channels, the access terminal 102 may send, and the access network 100 may thus receive, DRC messages and DSC messages substantially simultaneously). Each DSC message within the group of consecutive DSC messages may include a "DSC cover," which is an indication of a data source and corresponding coverage area from which the access terminal 102 desires future service.

Advantageously, an access terminal 102 may use the DSC channel to notify the access network 100 of an upcoming change to a new data source (e.g., cell) while the access terminal continues to receive data from the current data source. More particularly, while an access terminal 102 is operating in a first coverage area (e.g., sector) served by a first data source (e.g., base station 114), the access terminal 102 may point its DRC Cover to the first coverage area and its DSC Cover to the first data source. In turn, the access terminal 102 may send the access network 100 groups of DRC and DSC messages including these DRC and DSC covers and the access network 100 may serve the access terminal 102 in the first coverage area as described above.

Thereafter, the access terminal 102 may wish to switch to a second coverage area served by a second data source (such as base station 116). In this respect, the access terminal 102 may point its DSC cover to the second data source, while keeping its DRC cover pointed to the first coverage area. In turn, the next group of consecutive DSC messages sent by the access terminal 102 may include DSC covers pointed to the second data source. While sending these DSC messages with DSC Covers pointing to the second data source, the access terminal 102 will also continue sending groups of DRC messages with DRC Covers pointing to the first coverage area. Upon receiving the DRC messages specifying the first coverage area and the DSC messages specifying the second data source, the access network 100, and specifically the new data source (e.g., base station 116), may begin preparing to serve the access terminal 102 (e.g., by establishing a backhaul connection with the RNC 120 and receiving data from the packet-switched network 126), while the first data source continues to serve the access terminal 102 in the first coverage area. Accordingly, the addition of the DSC channel may improve throughput by reducing any delay that may occur while the access terminal 102 switches between coverage areas, and more particularly data sources.

In another aspect of IS-856, a base station may send an access terminal located in a given sector a "sector parameters" message and/or a "quickconfig" message. A sector parameters message that is sent in a given coverage area or sector may include a sector ID identifying that sector, a subnet mask for the subnet to which the sector belongs, and/or a country code. A quickconfig message may include the color code for the RNC serving the base station, as well as other information. Provided with the combination of a session parameters message and a quickconfig message, an access terminal 102 may acquire the subnet mask and color code corresponding to a sector in which it is located.

An access terminal 102 may use information provided in the sector parameters message and/or the quickconfig message to establish a session layer connection with access network 100. In particular, access terminal 102 may register with RNC 120, which serves the coverage area 106 in which it wishes to connect, by sending a Universal Access Terminal Identifier (UATI) request to the access network. More specifically, the access terminal 102 may send a UATI request, including information acquired from the sector parameters and/or quickconfig message (such as the color code and/or the subnet mask), to the base station 114 serving the sector or coverage area 106 in which the access terminal 102 desires to connect. The serving base station 114 then forwards the UATI request to its serving RNC 120, which in turn forwards the request to its session controller 130. The session controller 130 then assigns a UATI, and sends the assigned UATI to the serving RNC 120. RNC 120 then sends a UATI assignment message to the access terminal 102. The UATI assignment message may include various information such as the UATI itself, the color code of the serving RNC, the subnet mask, etc. In response to the UATI assignment message, the access terminal 102 sends the RNC 120 a UATI complete message, which the RNC 120 forwards to the session controller 130. The session controller 130 then sends a UATI complete response message to the RNC 120, finishing the UATI assignment process.

Once a UATI has been assigned, the RNC 120 may send a Traffic Channel Assignment (TCA) message to the access terminal 102. The TCA message identifies the Walsh Code for the sector 106 in which the access terminal 102 is connecting. The access terminal 102 may then select its desired serving sector 106 by covering its Data Rate Control (DRC) transmission with the particular Walsh code associated with the serving sector.

An access terminal may also use a UATI request to facilitate transfer of session information between RNCs when a handoff is performed. Specifically, when an access terminal detects a change in color code and/or subnet mask (for instance, in a quick config and/or session parameters message received by the access terminal), the access terminal may send a UATI request, which includes the color code and/or subnet mask of the serving RNC, to the target base station (i.e., the base station to which the handoff is to be performed). The access terminal may also include a Random Access Terminal Identifier (RATI) in the UATI Request. Further, for an existing session, the access terminal includes its current UATI (which can be used to identify its serving RNC). The target base station (i.e., the base station to which the handoff is to be performed), then forwards the request on to the target RNC (i.e., the RNC serving the target base station), which in turn forwards the request to its session controller.

When the session controller receives a UATI request, the session controller may determine whether the UATI request was received in the context of an access terminal establishing a new session or in the context of the access terminal handing off an existing session. The session controller makes this determination based on RATI in a received UATI request. If the session controller does not currently have record of a session involving the RATI, the session controller creates a UATI for a new session. If, on the other hand, the RATI already exists, the session controller can conclude the access terminal is attempting to handoff an existing communication session, which is identified by the RATI. The session controller may then use the UATI of the source RNC and/or the RATI to retrieve the session information from the source RNC, provide the session information to the target RNC, and then may assign a new UATI to session.

In some locations, an access terminal may receive quickconfig messages and/or session parameters messages from different RNCs in rapid succession. For instance, since sectors 108 and 110 overlap in part, this creates a zone 140 where service is available from both base station 116 and base station 118. Zone 140 is an example of an inter-RNC boundary zone; i.e. a geographic area defined by the overlap or adjacency of coverage areas served by different RNCs. In inter-RNC boundary zone 140, service may be available from at least one base station controlled by a first RNC, and from at least one other base station controlled by a second RNC. In the depicted example, inter-RNC boundary zone 140 is served by base station 116, which in turn is served by RNC 120, and by base station 118, which in turn is served by RNC 122. Thus, if access terminal 102 moves into inter-RNC boundary zone 140, the access terminal may ping pong between sectors 108 and 110 (and thus between base stations 116 and 118, and RNCs 120 and 122).

Figure 2:
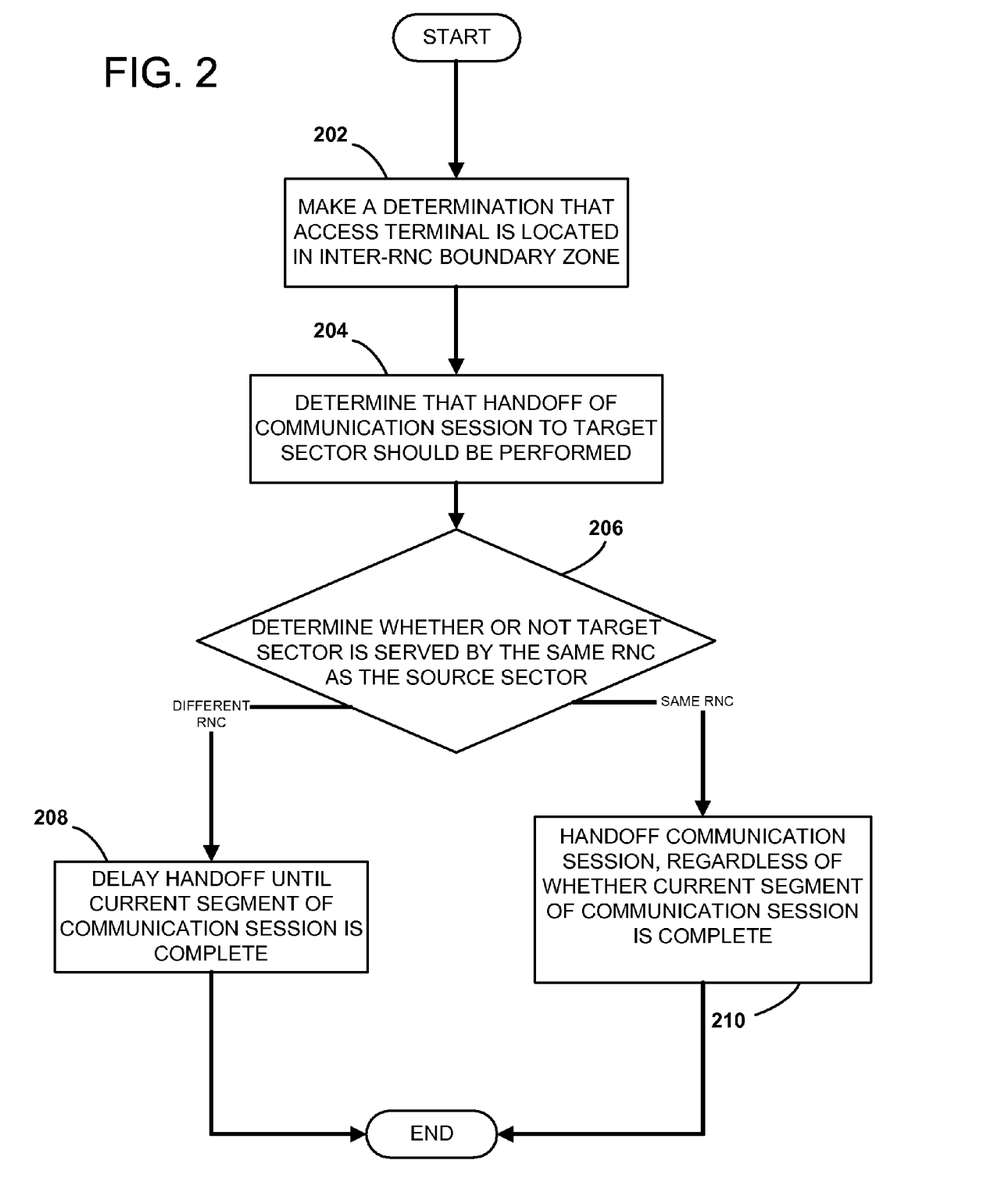
FIG. 2 is a flow chart illustrating an exemplary method.

Referring to the Figures, FIG. 2 is a flow chart illustrating an exemplary method. The method may involve an access terminal determining that it is located at an inter-RNC boundary zone, as shown by block 202. Upon making this determination, the access terminal may respond by modifying its handoff procedures. In particular, the access terminal may determine that a handoff of a communication session from a source sector to a target sector should be performed, as shown by block 204. Then, before performing the handoff, the access terminal may determine if the target sector is served by the same RNC as the source sector, as shown by block 206. If the target sector is not served by the same RNC as the source sector, then the access terminal delays handing off until a segment of the communication session is finished, and then hands off to the target sector, as shown by block 208. If, on the other hand, the target base station is served by the same RNC as the source sector, then the access terminal hands off to the target sector, regardless of whether a current segment of the communication session is complete, as shown by block 210.

A segment of a communication session may be delineated by the beginning and ending of a continuous or nearly continuous data flow or data transmission from one or more given participants in a communication session to one or more other participants in the session. Participants may include access terminal(s), access network(s), network entities, etc. As an example, in QChat and other push-to-talk communications, a participant in a QChat session may send a speech message (i.e., an utterance, or spoken word, phrase or sentence(s)) to other participants in the session. Another participant in the session may then do the same, and so on. To send each speech message, for instance, the participant may press a button on their access terminal, speak into a microphone (possibly while keeping the button depressed), and then release the button (if the button was depressed while speaking) or press the button a second time to create the speech message that is then broadcast to the other participants in the session. Thus, each speech message in a QChat session, being a continuous or nearly continuous transmission from one participant to the other participants, may be considered a "segment" of the QChat communication session.

Referring to the step of the access terminal determining that it is located at an inter-RNC boundary zone, an access terminal may make this determination as a result of receiving messages from or communicating with multiple RNCs. As an example, an access terminal may determine it is located in an inter-RNC boundary zone when three or more color code changes or subnet changes occur during session setup. An access terminal may also determine it is located in an inter-RNC boundary zone if, during an established session, a predetermined number (e.g., two or more, or preferably three or more) of color code changes, subnet changes, virtual handoff attempts and/or DSC channel change requests occur within a predetermined period of time.

The access terminal may determine that a handoff should be preformed in various ways. Preferably, a handoff is triggered when the access terminal determines that the pilot signal strength for a given sector has exceeded the pilot signal strength of its current sector by a predetermined amount (i.e., a standard IS-856 handoff trigger). A handoff may also be triggered for other reasons and those skilled in the art will recognize that the exemplary method may determine a handoff should be performed for any reason, or in response to any handoff trigger, without departing from the scope of the invention.

To facilitate the determination as to whether the target sector is served by the same RNC as the source sector, an access terminal may be provided with a list, referred to as an "infra-RNC" list, which identifies base stations that are served by the same RNC as the sector in which the access terminal is currently connected. Alternatively or additionally, the intra-RNC list may identify the sectors that are served by base stations that are served by the same RNC. The intra-RNC list may be generated and/or maintained by the serving base station and/or its serving RNC, or by other base stations and/or RNCs. The serving base station (e.g., the base station serving the sector in which the access terminal is connected) may broadcast the intra-RNC list periodically, provide it to the access terminal upon request, or detect when it is appropriate to send to the access terminal (i.e. by detecting three or more color code changes, subnet changes, etc.).

The access terminal may use the intra-RNC list to determine if the target base station (e.g., the base station serving the target sector) is served by the same RNC as the source base station (and thus the source sector). More specifically, when an access terminal determines a handoff to a target sector should be performed, the access terminal may reference the intra-RNC list to determine whether or not the base station serving the target sector is included in the intra-RNC list. If the base station is included in the intra-RNC list the base station determines that the target base station and sector are served by the same RNC as the source base station and sector. In an alternative embodiment, the intra-RNC list may also include base stations that are served by different RNCs. As such, the intra-RNC list may include an indication, for each included base station, as to whether the base station is served by the same or different RNC. Therefore, access terminals may use the indication associated with the target base station to determine whether or not the target base station and sector are served by the same RNC as the source base station and sector.

As shown in block 210, in cases where a handoff requires a transfer of session information between RNCs, the base station may delay the handoff until a segment of the communication session is complete. For instance, when an access terminal engaged in a QChat session hands off to a target sector served by the same RNC as its serving sector, a virtual handoff is performed (e.g., the access terminal transmits null DRC covers, changes its PN offset and/or Walsh code, etc.). Typically, to allow transfer of the communication between sectors, data flows between the access terminal and access network in both the source and target sectors are closed, while the access terminal and/or the access network creates a buffer or buffers of the data. The buffered data is then sent once the communication session is reestablished in the target sector. In practice, data flows are generally closed for 32 consecutive time slots, resulting in a burst delay of approximately 53 milliseconds (ms). However, when a handoff requires transfer between RNCs, data flows may be closed for approximately 260 ms, allowing additional time for transfer of session information between the RNCs. A mid-segment latency of 53 ms, or a 260 ms latency that is not experienced mid-segment, may be tolerable. On the other hand, a QChat session may fail if it experiences a mid-segment latency of 260 ms. As a result, when a transfer of session information between RNCs is required, the access terminal delays handing off until a segment of the communication session is complete.

More specifically, by delaying a handoff between RNCs so that it is initiated after the current segment is complete, the participating access terminal experiences the majority (and possibly the entirety) of the latency resulting from the handoff, between segments of the session (when a 260 ms latency is more likely to be tolerable). Preferably, the handoff is completed before the next segment of the session begins so that the latency does not occur during a segment of the session. To this end, an exemplary method may further involve the access terminal and/or the access network delaying the beginning of the next segment until the handoff is completed.

In an alternative embodiment, the access network (e.g., base station(s), RNC(s), and/or the session controller) may carry out or participate in the step of determining that the access terminal is located in an inter-RNC boundary zone. For instance, the access network may determine an access terminal is located in an inter-RNC boundary zone when, during session setup, the network detects multiple attempts of color code change or subnet change by an access terminal. As a specific example, the access network might receive three or more UATI requests during session setup, with each request including a color code or subnet mask that differs from those in the previously received request. In particular, the session controller and/or one or more RNCs may detect that UATI requests including the color code or subnet mask for two or more different RNCs are received in a predetermined period of time, and conclude that the access terminal initiating the communication session is located in an inter-RNC boundary zone.

The access network may also determine that an access terminal is located in an inter-RNC boundary zone during an established communication session. For instance, the network may determine an access terminal is located in an inter-RNC boundary zone when, during an established session, the network detects multiple attempts of color code change or subnet change, virtual handoff attempts, and/or DSC channel change request, by an access terminal. As a specific example, the session controller and/or one or more RNCs might receive multiple UATI requests in a predetermined period of time (such as 50 milliseconds, for instance), with each request including a color code or subnet different from the previously received request. Other examples are also possible.

Once the access network determines that an access terminal is located in an inter-RNC boundary zone, the access network may then send a message to the access terminal instructing the access terminal to modify its handoff procedure. Additionally or alternatively, the access network may modify its own procedures for processing handoff requests received from the access terminal. For instance, the access network may delay sending the TCA message providing the Walsh code for the target sector. Other procedures are also possible.

Figure 3:
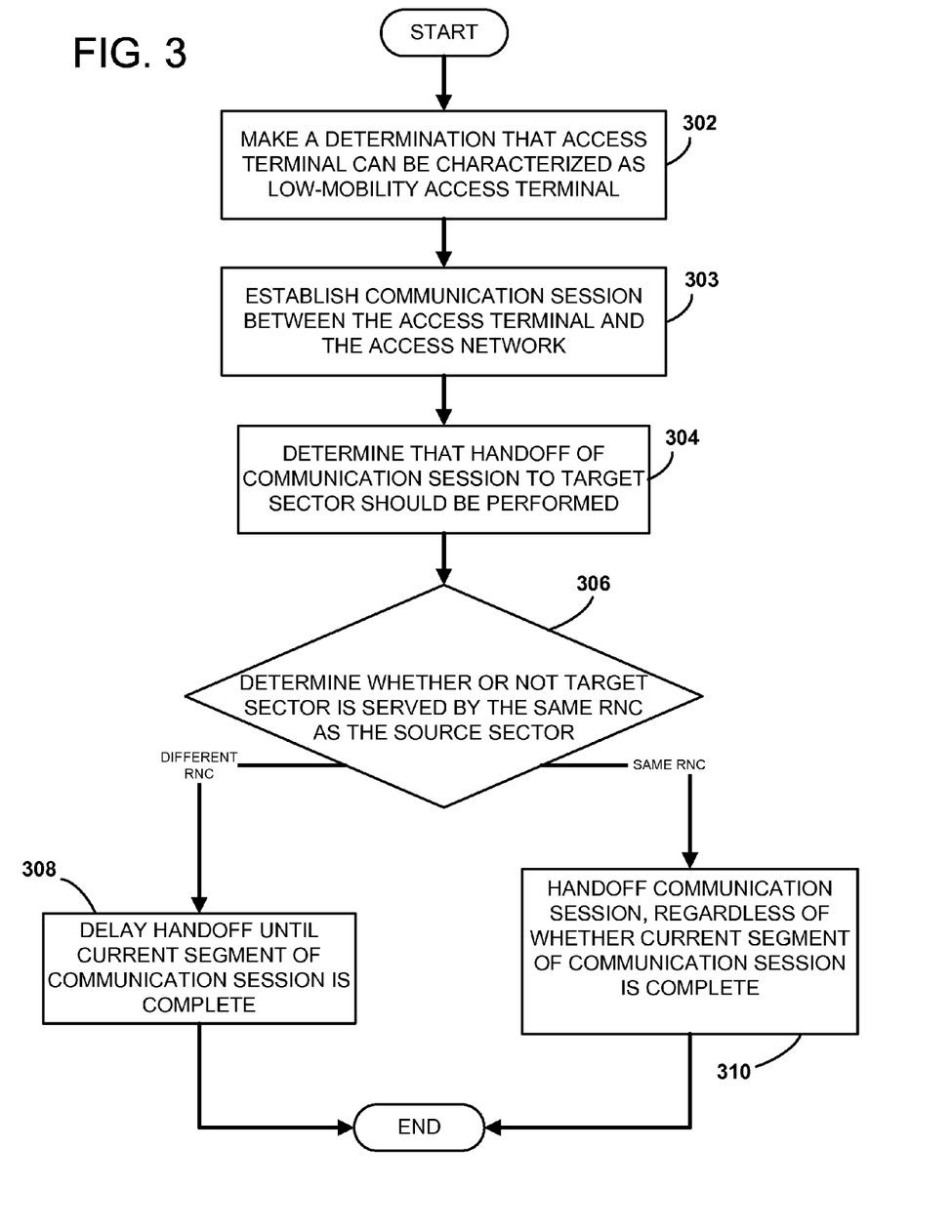
FIG. 3 is another flow chart illustrating an exemplary method.

Referring to the Figures, FIG. 3 is another flow chart illustrating an exemplary method. The method may involve an access terminal or access network determining that an access terminal can be characterized as a low-mobility access terminal, as shown by block 302. An access terminal may be characterized as a low-mobility access terminal when it is detected that it is located in an inter-RNC boundary zone. However, this characterization may be made in any way, and for any reason, without departing from the scope of the invention.

The method also involves establishing a communication session between the access terminal and the access network, as shown by block 303. It should be understood that because an access terminal may be characterized as low-mobility before a session is established, during session setup, or after a session is established, the order of blocks 302 and 303 may be reversed, or these blocks may be carried out simultaneously, without departing from the scope of the invention.

After the determination that an access terminal can be characterized as a low-mobility access terminal has been made, the access terminal may responsively modify its handoff procedure. In particular, the access terminal may determine that a handoff of a communication session from a source sector to a target sector should be performed, as shown by block 304. Then, before performing the handoff, the access terminal may determine if the target sector is served by the same RNC as the source sector, as shown by block 306. If the target base station is not served by the same RNC as the source base station, then the access terminal delays handing off until a segment of the communication session is finished, and then hands off to the target base station, as shown by block 308. If, on the other hand, the target base station is served by the same RNC as the source base station, then the access terminal hands off to the target sector, regardless of whether a current segment of the communication session is complete, as shown by block 310.

Exemplary embodiments of the present invention have been described above. It should be understood the word "exemplary" is used herein to mean "serving as an example, instance, or illustration." Any embodiment described herein as "exemplary" is not necessarily to be construed as preferred or advantageous over other embodiments. In addition, those skilled in the art will understand that changes and modifications may be made to these exemplary embodiments without departing from the true scope and spirit of the invention, which is defined by the claims.

We claim:

1. In an access network comprising a plurality of coverage areas, wherein each coverage area is served by one of a plurality of radio network controllers (RNCs), a method comprising:
    making a determination that an access terminal is located in an inter-RNC boundary zone; and
    after making the determination that the access terminal is located in the inter-RNC boundary zone, and during a communication session between the access terminal and the access network via a source coverage area of the access network:
        determining that a handoff of the communication session to a target coverage area should be performed;
        determining whether or not the target coverage area is served by the same RNC as the source coverage area;
        if the determination is that the target coverage area is not served by the same RNC as the source coverage area, delaying handoff until a current segment of the communication session is complete, and then handing off the communication session to the target coverage area; and
        if the determination is that the target coverage area is served by the same RNC as the source coverage area, handing off the communication session to the target coverage area, regardless of whether a current segment of the communication session is complete.

2. The method of claim 1, wherein the inter-RNC boundary zone comprises a geographic area where a first coverage area that is served by a first RNC is adjacent to or overlaps with a second coverage area that is served by a second RNC.

3. The method of claim 2, wherein the first coverage area comprises the source coverage area.

4. The method of claim 1, further comprising establishing the communication session between the access terminal and the access network.

5. The method of claim 1, wherein each of the plurality of coverage areas comprises sector of the access network.

6. The method of claim 1, wherein the access network further comprises a plurality of base stations, and wherein each coverage area is served by one of the plurality of RNCs via one of the plurality of base stations, wherein the base station that serves the coverage area is served by the RNC that serves the coverage area.

7. The method of claim 6, wherein the source coverage area is served by a source base station and the target coverage area is served by a target base station, and wherein determining whether or not the target coverage area is served by the same RNC as the source coverage area comprises:
    determining whether or not the target base station is served by the same RNC as the source base station.

8. The method of claim 6, wherein the source coverage area is served by a source base station and the target coverage area is served by a target base station, the method further comprising:
    receiving an intra-RNC list from the access network, wherein the intra-RNC list identifies one or more of the plurality of base stations that are served by the same RNC as the source base station or indicates that no base stations are served by the same RNC as the source base station;
    wherein determining whether or not the target coverage area is served by the same RNC as the source coverage area comprises using the intra-RNC list as a basis for determining whether or not the target base station is served by the same RNC as the source base station.

9. The method of claim 8, wherein the intra-RNC list further identifies one or more of the plurality of base stations that are not served by the source base stations and includes an indication as to whether or not each identified base station is served by the source base station.

10. The method of claim 1, wherein the communication session is a QChat communication session, and wherein the current segment of the communication session comprises a speech message from a participant in the QChat communication session.

11. An access terminal configured to engage in a communication session with an access network, wherein the access network comprises a plurality of coverage areas, wherein each coverage area is served by one of a plurality of radio network controllers (RNCs), the access terminal comprising:
    data storage;
    at least one processor;

program code stored in data storage and executable by the processor to:
- make a determination that the access terminal is located in an inter-RNC boundary zone, wherein the inter-RNC boundary zone comprises an area where a first coverage area that is served by a first RNC is adjacent to or overlaps with a second coverage area served by a second RNC;
- while the access terminal is located in a source coverage area of the access network, establish a communication session between the access terminal and the access network; and
- after the determination that the access terminal is located in the inter-RNC boundary zone has been made:
  - determine that a handoff of the communication session from the source coverage area to a target coverage area should be performed;
  - determine whether or not the target coverage area is served by the same RNC as the source coverage area;
  - if the determination is that the target coverage area is not served by the same RNC as the source coverage area, delay handoff until a current segment of the communication session is complete, and then initiate a handoff of the communication session to the target coverage area; and
  - if the determination is that the target coverage area is served by the same RNC as the source coverage area, hand off the communication session to the target coverage area, regardless of whether a current segment of the communication session is complete.

12. The access terminal of claim 11, wherein the inter-RNC boundary zone comprises a geographic area where a first coverage area that is served by a first RNC is adjacent to or overlaps with a second coverage area that is served by a second RNC.

13. The access terminal of claim 12, wherein the first coverage area comprises the source coverage area.

14. The access terminal of claim 11, wherein each of the plurality of coverage areas comprises a sector of the access network.

15. The access terminal of claim 11, wherein the access network further comprises a plurality of base stations, and wherein each coverage area is served by one of the plurality of RNCs via one of the plurality of base stations, wherein the base station that serves the coverage area is served by the RNC that serves the coverage area.

16. The access terminal of claim 15, wherein the source coverage area is served by a source base station and the target coverage area is served by a target base station, and wherein the program code stored in data storage and executable by the processor to determine whether or not the target coverage area is served by the same RNC as the source coverage area comprises:
- program code stored in data storage and executable by the processor to determine whether or not the target base station is served by the same RNC as the source base station.

17. The access terminal of claim 16, wherein the source coverage area is served by a source base station and the target coverage area is served by a target base station, wherein the program code stored in data storage is further executable by the processor to
- receive an intra-RNC list from the access network, wherein the intra-RNC list identifies one or more of the plurality of base stations that are served by the same RNC as the source base station or indicates that no base stations are served by the same RNC as the source base station;
- wherein the program code stored in data storage and executable by the processor to determine whether or not the target coverage area is served by the same RNC as the source coverage area comprises program code stored in data storage and executable by the processor to use the intra-RNC list as a basis for determining whether or not the target base station is served by the same RNC as the source base station.

18. The access terminal of claim 17, wherein the intra-RNC list further identifies one or more of the plurality of base stations that are not served by the source base stations and includes an indication as to whether or not each identified base station is served by the source base station.

19. In an access network comprising a plurality of coverage areas, wherein each coverage area is served by one of a plurality of radio network controllers (RNCs), a method comprising:
- characterizing an access terminal as a low-mobility access terminal;
- establishing a communication session between the access terminal and the access network, wherein the communication session is established in a first coverage area of the access network; and
- after characterizing an access terminal as a low-mobility access terminal:
  - determining that a handoff of the communication session to a second coverage area should be performed;
  - determining whether or not the second coverage area is served by the same RNC as the first coverage area;
  - if the determination is that the second coverage area is not served by the same RNC as the first coverage area, delaying handoff until a current segment of the communication session is complete, and then handing off the communication session to the second coverage area; and
  - if the determination is that the second coverage area is served by the same RNC as the first coverage area, handing off the communication session to the second coverage area, regardless of whether a current segment of the communication session is complete.

20. The method of claim 19, wherein characterizing an access terminal as a low-mobility access terminal comprises determining that messages have been received from at least two different RNCs in a predetermined period of time.

* * * * *